(12) United States Patent
Sasaki (10) Patent No.: US 12,253,402 B2
(45) Date of Patent: Mar. 18, 2025

(54) LIQUID LEVEL SENSOR

(71) Applicant: Kuwana Metals, Ltd., Kuwana (JP)

(72) Inventor: Akira Sasaki, Mie Ken (JP)

(73) Assignee: Kuwana Metals, Ltd., Kuwana (JP)

( * ) Notice: Subject to any disclaimer, the term of this patent is extended or adjusted under 35 U.S.C. 154(b) by 175 days.

(21) Appl. No.: 18/011,860

(22) PCT Filed: Jun. 29, 2021

(86) PCT No.: PCT/JP2021/024612
§ 371 (c)(1),
(2) Date: Dec. 21, 2022

(87) PCT Pub. No.: WO2022/004739
PCT Pub. Date: Jan. 6, 2022

(65) Prior Publication Data
US 2023/0258491 A1 Aug. 17, 2023

(51) Int. Cl.
*G01F 23/60* (2006.01)
*G01F 23/62* (2006.01)
*G01F 23/80* (2022.01)

(52) U.S. Cl.
CPC .............. *G01F 23/62* (2013.01); *G01F 23/60* (2013.01); *G01F 23/804* (2022.01); *G01F 23/808* (2022.01)

(58) Field of Classification Search
CPC ........ G01F 23/60; G01F 23/62; G01F 23/804; G01F 23/808
See application file for complete search history.

(56) References Cited

FOREIGN PATENT DOCUMENTS

| JP | 6232334 U | 2/1987 |
| JP | H02306124 A | 12/1990 |
| JP | H0564737 U | 8/1993 |
| JP | H0729423 U | 6/1995 |
| JP | 2003050151 A | 2/2003 |
| JP | 2006047016 A | 2/2006 |

OTHER PUBLICATIONS

Japan Patent Office, "International Search Report Regarding PCT/JP2021/024612", Sep. 28, 2021, p. 9, Published in: JP.

*Primary Examiner* — Eric S. McCall
(74) *Attorney, Agent, or Firm* — NOD Law PC (57) ABSTRACT

A liquid level sensor 1 comprises a sleeve 2 disposed so as to extend in the vertical direction, a float 3 configured so as to move along said sleeve according to fluctuation of liquid level, a resistor string 4, a plurality of grounding means 5 disposed inside the sleeve 2 and a liquid level signal output means 6 to take out an electric signal detected between a positive electrode side end part 4a and a junction part grounded by the grounding means 5 as a liquid level signal that is a signal corresponding to the liquid level, and further comprises a warning signal output means 7 to output a warning signal when the float 3 is located within a predetermined distance from a warning position that is a predetermined position within a movable range of the float 3. Thereby, a compact and reliable liquid level sensor is realized.

24 Claims, 8 Drawing Sheets

LIQUID LEVEL SENSOR

FIELD

This invention relates to a liquid level sensor.

BACKGROUND

A type of a liquid level sensor which converts information about a liquid level into an electric signal has been known.

Figure 8:
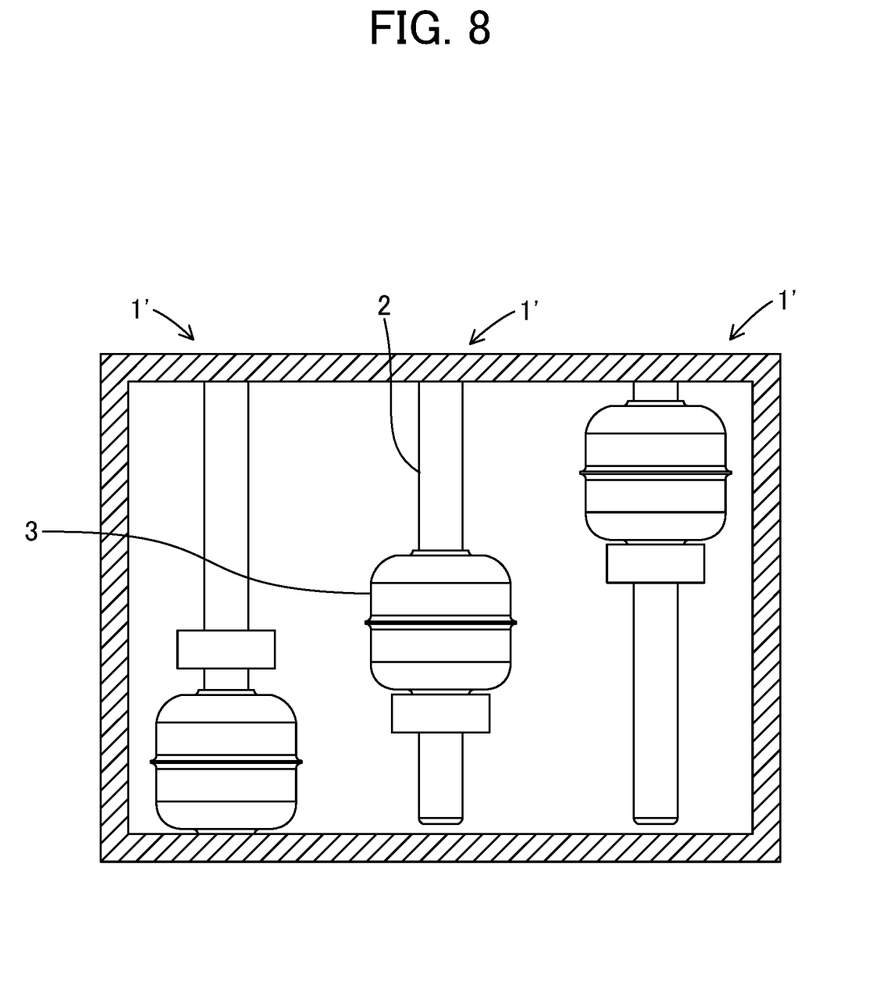
FIG. 8 is a partial sectional view for showing an example of a liquid level sensor according to a conventional technology.

For example, a liquid level sensor 1' according to a conventional technology exemplified in FIG. 8 is constituted by a sleeve 2 disposed so as to extend in the vertical direction, a float 3 which moves along the sleeve 2 according to fluctuation of a liquid level, and a reed switch (not shown) which is operated by a magnetic field generated by a magnet built in the float 3 when the float 3 approaches. By disposing a plurality of the liquid level sensors 1' in a tank, it can be known which position the liquid level is at an upper limit position, an intermediate position or a lower limit position, for example.

Moreover, for example, in Japanese Utility Model Application Laid-Open (kokai) No. H05-64737 (PTL1), an invention of a liquid level sensor which is constituted by a resistor string, in which a plurality of resistors is connected in series, and a plurality of reed switches which supply electric current to junction parts of the resistors is described. In this liquid level sensor, when the reed switch closes according to a position of a magnetic force source interlocked with a float, electric current is supplied to a part of the resistor string via the junction part. A resistance value of the part through which the electric current flows changes depending on a position of the closed reed switch. By detecting this resistance value, a residual quantity of a liquid corresponding to the resistance value can be detected.

SUMMARY

According to an aspect, a liquid level sensor is disclosed. The liquid level sensor includes a sleeve disposed so as to extend in a vertical direction, a float configured so as to move along said sleeve according to fluctuation of liquid level, and a resistor string including a plurality of resistors connected in series and having both ends always connected with a direct current power supply. The liquid level sensor also includes a plurality of grounding means disposed inside said sleeve respectively corresponding to junction parts between adjacent resistors included in said resistors in said resistor string, and configured such that said junction part is grounded when said float is located within a predetermined distance from the corresponding junction part and said junction part is not grounded when said float is not located within the predetermined distance from the corresponding junction part. In addition, the liquid level sensor includes a liquid level signal output means configured so as to take out an electric signal detected between a positive electrode side end part that is an end part connected with a positive electrode of said direct current power supply among said both end parts of said resistor string and said junction part grounded by said grounding means as a liquid level signal that is a signal corresponding to said liquid level. Additionally, a warning signal output means is configured such that a warning signal is output when said float is located within a predetermined distance from a warning position that is a predetermined position within a movable range of said float and the warning signal is not output when said float is not located within the predetermined distance from said warning position, a positive electrode grounding means is configured such that said positive electrode side end part or said junction part closest to said positive electrode side end part is grounded when said float is located within a predetermined distance from said grounding means corresponding to said junction part closest to said positive electrode side end part among a plurality of said grounding means or when said float is located outside the grounding means. A negative electrode grounding means configured such that said junction part closest to a negative electrode side end part, which is an end part on a side opposite to said positive electrode side end part of said resistor string, is grounded when said float is located within a predetermined distance from said grounding means corresponding to said junction part closest to said negative electrode side end part among a plurality of said grounding means or when said float is located outside the grounding means.

DETAILED DESCRIPTION

Technical Problem

The liquid level sensor 1' exemplified in FIG. 8 can detect, at a pinpoint, whether a liquid level is in a specific position or not. Moreover, since its configuration is simple, it is reliable. However, the number of liquid level sensors to be installed must correspond to the number of liquid levels to be detected. For this reason, it is necessary to increase the number of liquid level sensors to be disposed in order to increase the number of liquid levels to be detected in one apparatus, and there are problems such as increase in costs for installation and/or decrease in volume of a liquid which can be stored in a tank.

On the other hand, the liquid level sensor described in PTL1 can detect a height of a liquid level between a reed switch at the highest position and a reed switch in the lowest position as a pseudo analog signal with accuracy determined according to an interval at which the reed switches are disposed. However, since its configuration is more complicated as compared with the liquid level sensor exemplified in FIG. 8, there is a possibility that a wrong signal due to malfunction may be output.

The present invention has been conceived in view of the above-mentioned subject, and an objective of the present invention is to realize a compact and reliable liquid level sensor.

Solution to Problem

A liquid level sensor according to the present invention comprises a sleeve disposed so as to extend in the vertical direction, a float configured so as to move along the sleeve according to fluctuation of a liquid level, a resistor string including a plurality of resistors connected in series and having both ends always connected with a direct current power supply, a plurality of grounding means disposed inside the sleeve respectively corresponding to junction parts between adjacent resistors included in the resistors in the resistor string, and a liquid level signal output means configured so as to take out an electric signal detected between a positive electrode side end part that is an end part connected with a positive electrode of the direct current power supply among both end parts of the resistor string and the junction part grounded by the grounding means as a liquid level signal that is a signal corresponding to the liquid level. A plurality of the grounding means is configured such that the junction part is grounded when the float is located within a predetermined distance from the corresponding junction part and the junction part is not grounded when the float is not located within the predetermined distance from the corresponding junction part. In addition to the above, the liquid level sensor according to the present invention further comprises a warning signal output means configured such that a warning signal is output when the float is located within a predetermined distance from a warning position that is a predetermined position within a movable range of the float and the warning signal is not output when the float is not located within the predetermined distance from the warning position.

In accordance with the above-mentioned configuration, in the liquid level sensor according to the present invention, a liquid level can be detected with the liquid level signal acquired from the resistor string when a position of the float is within a range in which a plurality of the grounding means are disposed, and the warning signal emitted by the warning signal output means separate from the resistor string can be output when the position of the float is within a predetermined distance from the warning position.

In an embodiment of the present invention, the liquid level sensor further comprises a positive electrode grounding means configured so as to ground the positive electrode side end part when the float is located within a predetermined distance from the grounding means corresponding to the junction part closest to the positive electrode side end part among a plurality of the grounding means or when the float is located outside the grounding means and/or a negative electrode grounding means configured so as to ground the junction part closest to a negative electrode side end part, which is an end part on a side opposite to the positive electrode side end part of the resistor string, when the float is located within a predetermined distance from the grounding means corresponding to the junction part closest to the negative electrode side end part among a plurality of the grounding means or when the float is located outside the grounding means. In accordance with a configuration that the liquid level sensor comprises the negative electrode grounding means, for example, even in a case where an abnormality occurs in the grounding means corresponding to the junction part closest to the positive electrode side end part and therefore the corresponding junction part cannot be grounded, since the positive electrode side end part is grounded by the positive electrode grounding means when the float is located within a predetermined distance from the grounding means or when the float is located outside the grounding means, the liquid level signal corresponding to the position of the grounding means corresponding to the junction part closest to the positive electrode side end part can be taken out. Moreover, in accordance with a configuration that the liquid level sensor comprises the negative electrode grounding means, for example, even in a case where an abnormality occurs in the grounding means corresponding to the junction part closest to the negative electrode side end part and therefore the corresponding junction part cannot be grounded, since the junction part closest to the negative electrode side end part is grounded by the negative electrode grounding means when the float is located within a predetermined distance from the grounding means or when the float is located outside the grounding means, the liquid level signal corresponding to the position of the grounding means corresponding to the junction part closest to the negative electrode side end part can be taken out.

Advantageous Effects of Invention

In accordance with the present invention, by the liquid level sensor constituted by one sleeve, a liquid level can be detected with high accuracy based on a liquid level signal, and simultaneously a reliable warning signal can be generated. Thereby, for example, when the liquid level sensor according to the present invention is applied to a tank, a liquid level can be managed correctly and certainly without reducing a liquid storage capacity of the tank.

Description of Embodiments

Embodiments for implementing the present invention will be explained below in detail. The following explanation and drawings are intended to show examples of embodiments for carrying out the present invention, and embodiments for carrying out the present invention are not limited to embodiments exemplified in the following explanation and drawings.

A liquid level sensor 1 according to the present invention has a sleeve 2 disposed so as to extend in the vertical direction. The sleeve 2 is fixed such that its longitudinal direction coincides with a direction perpendicular to a liquid surface of a liquid. At least a part of an exterior of the sleeve 2 is in contact with a liquid and a grounding means 5, which will be mentioned later, is disposed inside the sleeve 2. Namely, the sleeve 2 has a function as a protecting tube for isolating the grounding means 5 which is an electronic component constituting the liquid level sensor 1 from a liquid. A resistor string 4, which will be mentioned later, may be disposed inside the sleeve 2. Alternatively, the resistor string 4 may be disposed outside the sleeve 2 and each of a plurality of the grounding means 5 disposed inside the sleeve 2 may be connected with each of a plurality of the junction parts 4c of the resistor string 4 disposed outside the sleeve 2 through a lead wire, a flexible printed circuit board or the like, for example.

The sleeve 2 also has a function as a guide of a float 3 which moves according to fluctuation of a liquid level (which will be mentioned later). In a preferred embodiment of the present invention, the float 3 has a hole which has the shape of a cross section corresponding to a shape of a cross section of the sleeve 2, and moves up and down in a state where the sleeve 2 is inserted through the hole. The shape of the cross section of the sleeve 2 may be a circular shape, or may be an elliptical shape and a polygonal shape. From a viewpoint of stable movement of the float 3, it is preferable that the shape of the cross section of the sleeve 2 is identical (unchanging) along the lengthwise direction of the sleeve 2.

As a material which constitutes the sleeve 2, a material which has a corrosion resistance against a liquid is desirable, and stainless steel can be used, for example. As will be mentioned later, in a case where the float 3 comprises a magnet and the grounding means 5 detects a magnetic field generated by the magnet to be operated, it is preferable to choose a material which is not magnetized easily as a material constituting the sleeve 2 such that penetration of the magnetic field to the grounding means 5 and the movement of the sleeve 2 in an up-and-down direction may not be prevented.

The liquid level sensor 1 according to the present invention has the float 3 which moves along the sleeve 2 according to fluctuation of a liquid level. The float 3 is configured to float on a liquid surface by buoyancy. Typically, the float 3 has a hollow structure. In the present invention, a liquid level is detected indirectly by detecting a position of the float 3. Since a positional relation between the float 3 and a liquid surface changes to arise a detection error of a liquid level when a liquid enters the inside of the float 3 (for example, a hollow part etc.), it is necessary to configure the float 3 such that there is no entrance and exit of a liquid. It is preferable that at least a part of the float 3, which faces the sleeve 2, is constituted by a material which is not magnetized easily.

The liquid level sensor 1 according to the present invention comprises the resistor string 4 disposed inside or outside the sleeve 2, including a plurality of resistors connected in series and having both ends (a positive electrode side end part 4a and a negative electrode side end part 4b) always connected with a direct current power supply. The positive electrode side end part 4a is an end part connected with a positive electrode of the direct current power supply among the both end parts of the resistor string 4, and the negative electrode side end part 4b is an end part on a side opposite to the positive electrode side end part 4a of the resistor string 4. The resistor string 4 in combination with a grounding means 5, which will be mentioned later, has a function to convert position information of the float 3 (namely, a liquid level) into an electric liquid level signal. It is preferable that a plurality of grounding means 5 disposed inside the sleeve 2 respectively corresponding to the junction parts 4c between the adjacent resistors in the resistor string 4 is arranged in parallel (namely, between the junction part 4c and the ground (earth)) in the same order as arrangement order of a plurality of the resistors or in reverse order thereto. Since a liquid level signal can always be monitored by always connecting the direct current power supply to the resistor string 4, reliability of a liquid level signal increases.

Resistors which have an accurate resistance value are preferable as a plurality of the resistors constituting the resistor string 4, and resistors which have a small footprint are preferable when the resistor string 4 is disposed inside the sleeve 2. As such a resistor, a chip resistor etc. can be used, for example. The number of the resistors which constitute the resistor string 4 can be properly selected depending on a length of a range of liquid level to be detected, a size of the resistors, and detection accuracy of a liquid level, etc. In the present invention, electric wiring, a lead wire and a terminal electrically connecting the adjacent resistors in the resistor string 4, etc., as well as conductors at the same electric potential as them are referred to as "junction parts 4c."

The liquid level sensor 1 according to the present invention comprises a plurality of the grounding means 5 disposed inside the sleeve 2 respectively corresponding to the junction parts 4c between the adjacent resistors in the resistor string 4. A plurality of the grounding means 5 are configured such that said junction part 4c is grounded when the float 3 is located within a predetermined distance from the corresponding junction part 4c and said junction part 4c is not grounded when the float 3 is not located within the predetermined distance from the corresponding junction part 4c. In the present invention, the number of the grounding means 5 may be equivalent to the number of the resistors included in the resistor string 4, or may be a number smaller than that. When the number of the grounding means 5 is equivalent to the number of the resistors, detection accuracy of a liquid level becomes the highest. When the grounding means 5 is thinned out to a number smaller than the number of the resistors, the detection accuracy of a liquid level falls.

In the present invention, "grounding a junction part" means electrically connecting the junction part 4c to the ground (earth) of an electric circuit which constitutes the liquid level sensor 1. When the junction part 4c is connected to the ground (earth), since electric potential of the negative electrode side end part 4b originally connected to the ground (earth) becomes the same as electric potential of the grounded junction part 4c, no electric current flows through the resistors between the both, and electric current flows only through the resistors between the positive electrode side end part 4a and the grounded junction part 4c. This electric signal is output outside as a liquid level signal that is a signal corresponding to a liquid level using a liquid level signal output means 6 which will be mentioned later.

A plurality of the grounding means 5 which the liquid level sensor 1 according to the present invention comprises ground the junction part 4c when the float 3 is in a position close thereto. The grounding means 5 operated at this time may be only one closest to the float 3, or may be a plurality of those which adjoin each other. Specifically, it may be configured that only one grounding means 5 closest to the float 3 is operated to ground the junction part 4c corresponding to this grounding means 5. Alternatively, it may be configured that, simultaneously with the grounding means 5 closest to the float 3, the second closest grounding means 5 or the second and third closest grounding means 5 are operated to ground the junction parts 4c corresponding respectively to these grounding means 5.

However, when it is configured such that only one grounding means 5 close to the float 3 is operated, there is a possibility that a moment at which no grounding means 5 is operated (no junction part 4c is grounded) may arise in a time period from change of a position of the float 3 to operation of the adjacent grounding means 5 and an unpredictable jump may arise in the liquid level signal. Therefore, it is preferable to adjust intervals of the grounding means 5 and intensity of the magnetic field generated by a magnet which will be mentioned later, etc. such that such a moment may not arise, and it is more preferable to configure such that ranges of positions of the float 3 at which the adjacent grounding means 5 are operated may be overlapped partially with each other. When it is configured such that ranges of positions of the float 3 at which the adjacent grounding means 5 are operated may be overlapped partially with each other in this way, a plurality of the grounding means 5 are being operated simultaneously. In this case, the liquid level signal corresponding to the position of the grounding means 5 corresponding to the junction part 4c closest to the positive electrode side end part 4a of the resistor string 4 among a plurality of the junction parts 4c being grounded by the grounding means 5 under operation.

Figure 1:
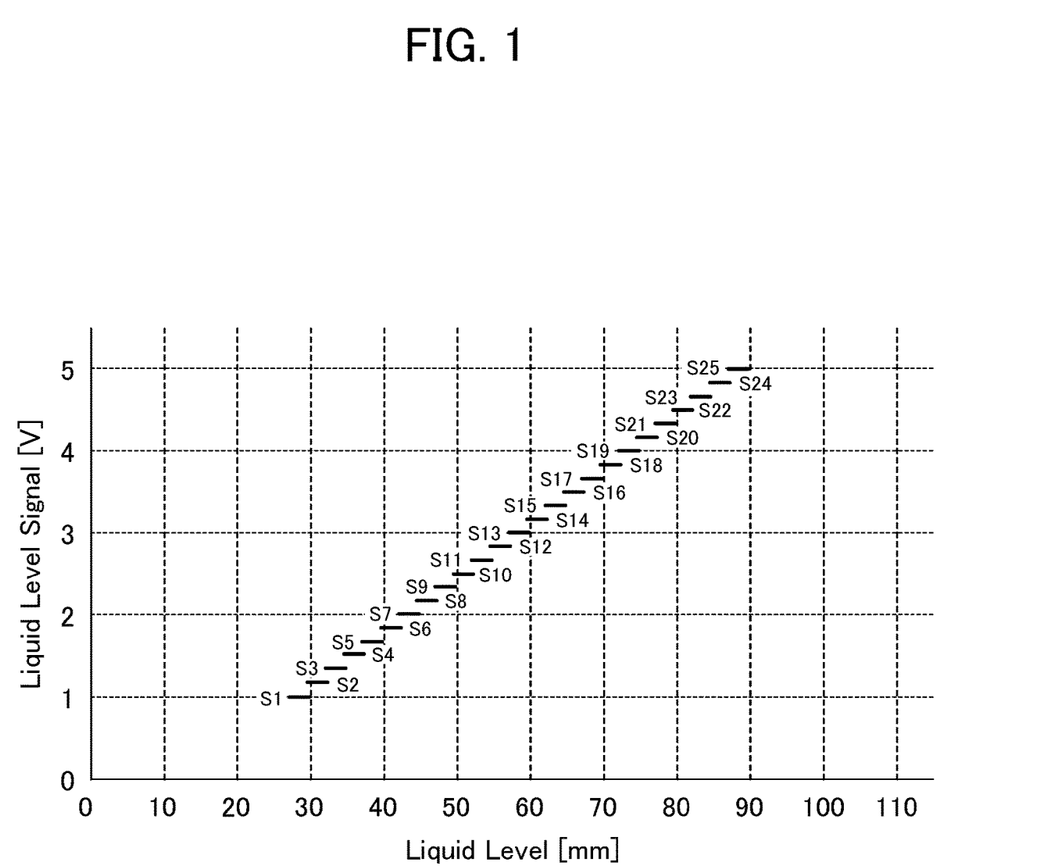
FIG. 1 is a schematic graphic chart for showing an example of ranges of liquid levels at which respective sensors constituting a plurality of grounding means are operated and magnitude of liquid level signals output when the respective sensors are operated.

FIG. 1 is a schematic graphic chart for showing an example of ranges of liquid levels at which respective sensors S1 to S25 constituting twenty-five grounding means 5 are operated and magnitude of the liquid level signals output when the respective sensors 5 are operated. The horizontal axis indicates the liquid level [mm] and, and the vertical axis indicates the magnitude of the liquid level signal [V]. As shown in the graphic chart of FIG. 1, the range of the liquid level at which each of the sensors is operated and the range of the liquid level at which the adjacent sensors are operated are slightly overlapped with each other. As a result, while substantially attaining a configuration in which only one grounding means 5 closest to the float 3 is operated, a possibility that the moment at which no grounding means 5 is operated may arise in a time period from change of a position of the float 3 to operation of the adjacent grounding means 5 and an unpredictable jump may arise in the liquid level signal can be reduced.

The liquid level sensor 1 according to the present invention comprises the liquid level signal output means 6 configured so as to take out an electric signal detected between the positive electrode side end part 4a that is an end part connected with a positive electrode of the direct current power supply among the both end parts of the resistor string and the junction part 4c grounded by the grounding means 5 as a liquid level signal that is a signal corresponding to the liquid level. Here, the electric signal between the positive electrode side end part 4a and the junction part 4c grounded by the grounding means 5, which is taken out as the liquid level signal, may be a voltage signal, or may be a current signal. When the electric signal taken out as the liquid level signal is a voltage signal, a range of the voltage may be 1.0V or more and 5.0 V or less, and may be also 0.0 V or more and 5.0 V or less depending on a purpose. When the electric signal is a current signal, a range of the current may be 4 mA or more and 20 mA or less. The liquid level signal taken out in such a way is a pseudo analog signal including information about the liquid level. By processing the liquid level signal electrically by a well-known method, the liquid level can be detected.

In configurations of the liquid level sensor 1 according to the present invention, it is not particularly limited whether the grounding means 5 corresponding to the junction part 4c closest to the positive electrode side end part 4a of the resistor string 4 and the grounding means 5 corresponding to the junction part 4c closest to the negative electrode side end part 4b are disposed at an upper limit position or a lower limit position of the liquid level to be detected. For example, when the grounding means 5 corresponding to the junction part 4c closest to the positive electrode side end part 4a of the resistor string 4 is disposed at the lower limit position of the liquid level, the higher the liquid level moves up, the more the number of the resistors which exist between the positive electrode side end part 4a and the junction part 4c grounded by the grounding means 5 increases. Therefore, when the direct current power supply is a constant current power supply and the electric signal taken out as the liquid level signal is a voltage signal, the higher the liquid level moves up, the larger the intensity of the liquid level signal becomes. Moreover, when the direct current power supply is a constant voltage power supply and the electric signal taken out as the liquid level signal is a current signal, the higher the liquid level moves up, the smaller the intensity of the liquid level signal becomes. Conversely, the grounding means 5 corresponding to the junction part 4c closest to the negative electrode side end part 4b of the resistor string 4 is disposed at the lower limit position of the liquid level, the higher the liquid level moves up, the more the number of the resistors which exist between the positive electrode side end part 4a and the junction part 4c grounded by the grounding means 5 decreases. Therefore, when the direct current power supply is a constant current power supply and the electric signal taken out as the liquid level signal is a voltage signal, the higher the liquid level moves up, the smaller the intensity of the liquid level signal becomes. Moreover, when the direct current power supply is a constant voltage power supply and the electric signal taken out as the liquid level signal is a current signal, the higher the liquid level moves up, the larger the intensity of the liquid level signal becomes. In either case, since the acquired liquid level signal can be electrically processed to be converted into information about the liquid level, there is no practical problem.

Here, behavior of the liquid level sensor in a case where one of the sensors which constitute a plurality of the grounding means 5 broke down will be explained in detail below. In the following explanation, the liquid level sensor configured such that sensors S(1), S(2), S(3) . . . S(n−1) and S(n) which constitute a plurality of the grounding means 5 corresponding to the respective junction parts 4c which exist in series from the positive electrode side end part 4a toward the negative electrode side end part 4b of the resistor string 4 are disposed in an order from the lower limit toward the upper limit of the liquid level and only one grounding means 5 closest to the float 3 is operated will be explained.

When all the sensors S(1) to S(n) constituting the grounding means 5 in the above-mentioned liquid level sensor are normal, the value of the output liquid level signal changes following the rise of the liquid level as shown in the following Table 1. The "ON" indicated in the table means that the sensor as the grounding means 5 is operated due to approach of the float 3 and the corresponding junction part 4c is grounded, and 1 to n indicate the liquid level moving up from the lower limit to the upper limit of the liquid level and the positions of the corresponding sensors.

TABLE 1

| Liquid Level | Sensor | | | | | | Liquid Level Signal |
| --- | --- | --- | --- | --- | --- | --- | --- |
| | 1 | 2 | 3 | . . . | n-1 | n | |
| n | | | | | | ON | Output n |
| n-1 | | | | | ON | | Output n-1 |
| . | | | | . . . | | | . |
| . | | | | | | | . |
| . | | | | | | | . |
| 3 | | | ON | | | | Output 3 |
| 2 | | ON | | | | | Output 2 |
| 1 | ON | | | | | | Output 1 |

As mentioned above, when all the sensors S(1) to S(n) are normal, the sensor as the grounding means 5 close to the position of the float 3 corresponding to the liquid level is operated and the liquid level signal corresponding to the position of the sensor is output.

Next, a case where the third sensor S(3) from the lower limit of the liquid level among the sensors S(1) to S(n) is always in an "ON" state (state where the third sensor S(3) is operated and the corresponding junction part 4c is grounded irrespective of the position of the float 3) due to malfunction is supposed. In this case, the value of the output liquid level signal changes following the rise of the liquid level as shown in the following Table 2.

TABLE 2

| Liquid Level | Sensor | | | | | Liquid Level Signal |
|---|---|---|---|---|---|---|
| | 1 | 2 | 3 | ... n-1 | n | |
| n | | | ON | | ON | Output 3 |
| n-1 | | | ON | ON | | Output 3 |
| . | | | ON | ... | | . |
| . | | | | | | . |
| . | | | | | | . |
| 3 | | | ON | | | Output 3 |
| 2 | | ON | ON | | | Output 2 |
| 1 | ON | | ON | | | Output 1 |

As mentioned above, when a plurality of the grounding means 5 are being operated simultaneously, the liquid level signal corresponding to the position of the grounding means 5 corresponding to the junction part 4c closest to the positive electrode side end part 4a of the resistor string 4 among a plurality of the junction parts 4c grounded by the grounding means 5 under operation is output. Therefore, as shown in Table 2, even when the liquid level has moved higher than the third sensor S(3) from the lower limit, the same liquid level signal (output 3) as that in a case where the liquid level is at the position of sensor S(3) is output. However, when the liquid level is at the same position as the sensor S(3) or a position lower than the sensor S(3), the liquid level signals (output 1, output 2 and output 3) according to the positions of the first, second and third sensors S(1), S(2) and S(3) from the lower limit are correctly output like the normal time shown in Table 1.

Next, a case where an operating state of the third of sensor S(3) from the lower limit of the liquid level is in an "uncertain" state (for example, a state in which the sensor S(3) is operated, is not operated or outputs an abnormal signal irrespective of the position of the float 3) due to malfunction is supposed. In this case, the value of the output liquid level signal changes following the rise of the liquid level as shown in the following Table 3.

TABLE 3

| Liquid Level | Sensor | | | | | Liquid Level Signal |
|---|---|---|---|---|---|---|
| | 1 | 2 | 3 | ... n-1 | n | |
| n | | | Uncertain | | ON | Uncertain |
| n-1 | | | Uncertain | ON | | Uncertain |
| . | | | Uncertain | ... | | . |
| . | | | | | | . |
| . | | | | | | . |
| 3 | | | Uncertain | | | Uncertain |
| 2 | | ON | Uncertain | | | Output 2 |
| 1 | ON | | Uncertain | | | Output 1 |

As mentioned above, when the liquid level is at the same position as the broken sensor S(3) or a position higher than the broken sensor S(3), the liquid level signal is also uncertain since the operating state of sensor S(3) is "unfixed." However, when the liquid level is at a position lower than the sensor S(3), the liquid level signals (output 1 and output 2) according to the positions of the first and second sensors S(1), S(2) and S(3) from the lower limit are correctly output like the normal time shown in Table 1.

Next, a case where the third of sensor S(3) is in an "OFF" state (a state in which the sensor S(3) is not operated and the corresponding junction part 4c is not grounded irrespective of the position of the float 3) due to malfunction is supposed. In this case, the value of the output liquid level signal changes following the rise of the liquid level as shown in the following Table 4.

TABLE 4

| Liquid Level | Sensor | | | | | Liquid Level Signal |
|---|---|---|---|---|---|---|
| | 1 | 2 | 3 | ... n-1 | n | |
| n | | | OFF | | ON | Output n |
| n-1 | | | OFF | ON | | Output n-1 |
| . | | | OFF | ... | | . |
| . | | | | | | . |
| . | | | | | | . |
| 3 | | | OFF | | | Maximum |
| 2 | | ON | OFF | | | Output 2 |
| 1 | ON | | OFF | | | Output 1 |

In this case, when the float 3 is close to the sensor S(3), originally, the sensor (3) should be operated to be in the "ON" state to ground the corresponding junction part 4c and thereby the correct liquid level signal (output 3) should be output. However, the sensor S(3) is not brought into the "ON" state and remains in the "OFF" state due to malfunction. Therefore, when the float 3 is close to the sensor S(3), none of the grounding means 5 is operated (none of the junction parts 4c is grounded) and the magnitude of the liquid level signal becomes the maximum which can be output by the resistor string 4. As a result, there is a possibility that the magnitude of the liquid level signal may jump suddenly when the float 3 is passing through the position of the sensor S(3) to lead to problems such as confusing an operator, for example. However, when the float 3 is close to the sensors other than the sensor S(3), the liquid level signals (output 1, output 2 ... output n-1 and output n) according to the positions of the first, second ... n-1-th and n-th sensors S(1), S(2), S(3) ... S(n-1) and S(n) from the lower limit are correctly output like the normal time shown in Table 1.

As explained above referring to Table 2 to Table 4, in the liquid level sensor 1 according to the present invention, even in a case where a part of a plurality of the grounding means 5 broke down to become impossible to be operated normally, all the functions as a liquid level sensor are not necessarily lost, and it is possible to detect a part of the range of the liquid level to be detected like the normal time. Namely, it can be said that a liquid level sensor which has such a configuration has higher redundancy.

By the way, as exemplified in Table 4, in a case where a part of the sensors is always in the "OFF" state due to malfunction, when the float 3 is located close to the broken sensor, it results in the state where no grounding means 5 is operating, and a problem that the magnitude of the liquid level signal jumps suddenly arises. This is because the liquid level sensor is configured such that only one grounding means 5 closest to the float 3 is operated. In order to reduce such problems, it is preferable to configure liquid level sensor such that at least two adjacent grounding means 5 are operated according to the position of the float 3.

Figure 2:
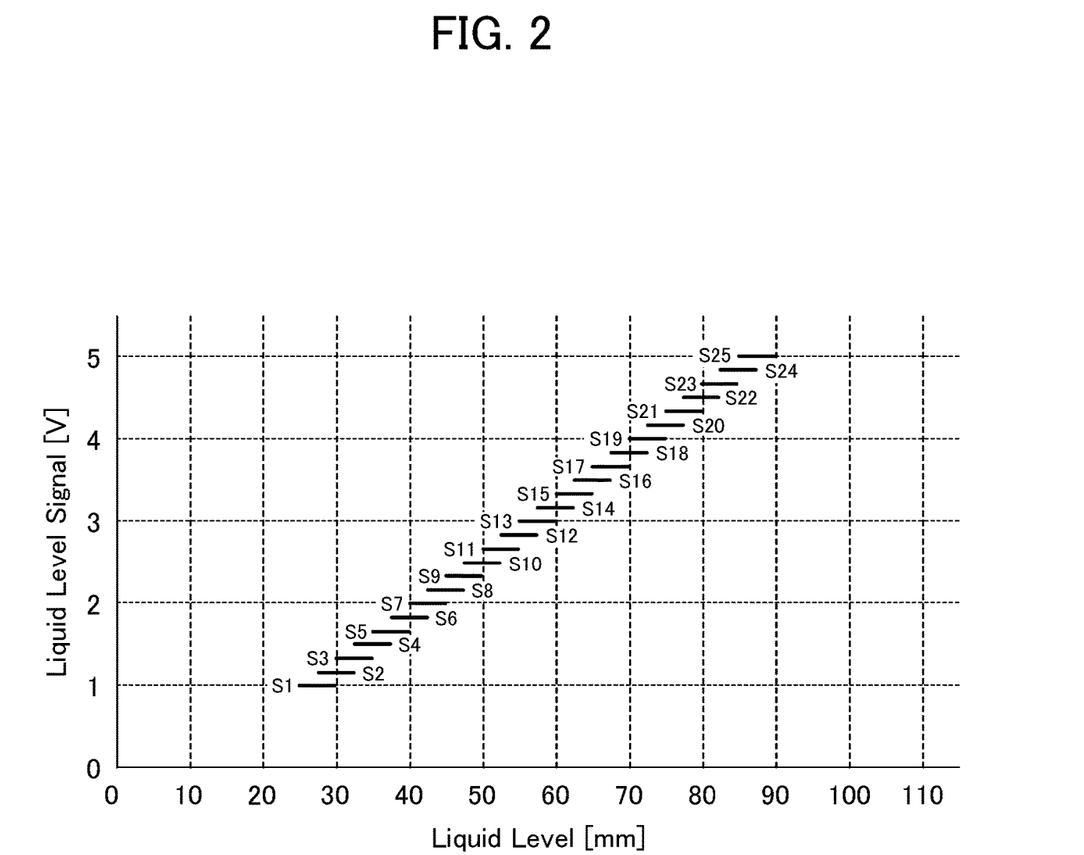
FIG. 2 is a schematic graphic chart for showing another example of ranges of liquid levels at which respective sensors constituting a plurality of grounding means and magnitude of liquid level signals output when the respective sensors are operated.

FIG. 2 is a schematic graphic chart for showing another example of ranges of liquid levels at which respective sensors S1 to S25 constituting twenty-five grounding means 5 and magnitude of liquid level signals output when the respective sensors are operated. As shown in the graphic chart in FIG. 2, in this example, the interval between the grounding means 5 and the intensity of the magnetic field generated by the magnet which the float 3 comprises, etc. are adjusted such that at least two adjacent grounding means 5 are operated according to the position of the float 3. Except for this point, FIG. 2 is the same graphic chart as that in FIG. 1. In the liquid level sensor which has such a configuration, even in a case where the sensor S(3) is always in the "OFF" state due to malfunction as exemplified in Table 4, the value of the liquid level signal changes following the rise of the liquid level as shown in the following Table 5.

TABLE 5

| Liquid Level | Sensor | | | | | | Liquid Level Signal |
|---|---|---|---|---|---|---|---|
| | 1 | 2 | 3 | 4 | ... | n-1 | n | |
| n | | | OFF | | | | ON | Output n |
| n-1 | | | OFF | | | ON | ON | Output n-1 |
| . | | | OFF | | ... | ON | | . |
| . | | | | | | | | . |
| . | | | | | | | | . |
| 4 | | | OFF | ON | ON | | | Output 4 |
| 3 | | | OFF | ON | | | | Output 4 |
| 2 | | ON | OFF | | | | | Output 2 |
| 1 | ON | ON | OFF | | | | | Output 1 |

As shown in Table 5, even when the float 3 is at a position at which the sensor S(3) and the sensor S(4) should be simultaneously in the ON state originally, since the sensor S(3) remains in the OFF state due to malfunction, the sensor closest to the positive electrode side end part among the sensors which are being operated comes to be the sensor S(4). For this reason, although the liquid level signal (output 3) corresponding to the position of the sensor S(3) should be originally output when the float 3 is at the position, the liquid level signal (output 4) corresponding to the position of the sensor S(4) is output. As a result, although the time period when the liquid level signal (output 4) corresponding to the position of sensor S(4) is output becomes longer, it does not result in a "state where none of the grounding means 5 is operated (none of the junction parts 4c is grounded)" as exemplified in Table 4. As a result, the possibility that the magnitude of the liquid level signal may jump suddenly when the float 3 is passing through the position of the sensor S(3) to lead to problems such as confusing an operator is reduced. Namely, it can be said that a liquid level sensor which has such a configuration has further higher redundancy.

Next, a configuration related to reliability of an alarm function characteristic in the present invention will be explained. The liquid level sensor 1 according to the present invention further comprises a warning signal output means 7 configured such that a warning signal is output when the float 3 is located within a predetermined distance from a warning position that is a predetermined position within a movable range of the float 3 and the warning signal is not output when the float 3 is not located within the predetermined distance from the warning position. For example, the warning signal output means 7 may be configured such that the warning signal is output when the float 3 is located outside the range in which a plurality of the grounding means 5 are disposed. "The float 3 is located outside the range in which the grounding means 5 are formed" means that the float 3 does not exist within a range from the upper limit position to the lower limit position of the liquid level to be detected by a plurality of the grounding means 5, but the float 3 exists above the upper limit position of the liquid level or below the lower limit position of the liquid level. In this case, a predetermined position above the upper limit position of the liquid level or below the lower limit position of the liquid level is the warning position, and the warning signal output means 7 can output an upper limit warning signal when the float 3 is located above the upper limit position and a lower limit warning signal when the float 3 is located below the lower limit position, respectively. In the present invention, the warning signal output means 7 may be configured so as to output either one of the upper limit warning signal or the lower limit warning signal.

In addition to the above or instead of the above, for example, the warning signal output means 7 may be configured such that a warning signal is output when the float 3 exists at (a position within a predetermined distance from) a predetermined position within a range in which a plurality of the grounding means 5 are disposed. In this case, the above-mentioned "predetermined position" within the range in which a plurality of the grounding means 5 are disposed is the warning position, and the warning signal output means 7 can output the warning signal when the float 3 exists at (the position within the predetermined distance from) the warning position. In either case, one or two or more warning positions can be set if needed.

In the present invention, the warning signal output means 7 is constituted as an independent configuration separate from the liquid level signal output means 6. For this reason, even if an error occurred somewhere in the liquid level signal output means 6 and the liquid level signal did not indicate an actual liquid level, the warning signal such as the upper limit warning signal and/or the lower limit warning signal can be generated normally. Thereby, as compared with a liquid level sensor according to a conventional technology which does not comprise the independent warning signal output means 7, reliability of the liquid level sensor can be improved.

Specific configurations of the warning signal output means 7 according to the present invention are not limited in particular. Preferably, an additional grounding means 7a which constitutes the warning signal output means 7 can be disposed at a predetermined position outside the range in which the grounding means 5 which constitute the liquid level signal output means 6 are disposed or within this range and within the movable range of the float 3. As mentioned above, the upper limit warning signal can be generated when the grounding means 7a is added outside the upper limit position of the liquid level, and the lower limit warning signal can be generated when the grounding means 7a is added outside the lower limit position of the liquid level. Alternatively, both of these may be added. The additional grounding means 7a which constitutes the warning signal output means 7 may be disposed at the same position as either of a plurality of the grounding means 5 which constitute the liquid level signal output means 6, or may be inserted to be disposed between the adjacent grounding means 5.

It is preferable that these additional grounding means 7a are operated by the same operating principle as the operating principle of the grounding means 5 which constitute the liquid level signal output means 6, since the configuration in common with that of the liquid level signal output means 6 can be used. Here, the "configuration in common" is a magnet or a light source (which will be mentioned later) installed in the float 3, for example. Alternatively, as the additional grounding means 7a which constitutes the warning signal output means 7, a means different from the grounding means 5 which constitute the liquid level signal output means 6, such as a limit switch, may be adopted, for example.

In a preferred embodiment of the present invention, the liquid level sensor 1 further comprises a positive electrode grounding means 8a configured so as to ground the positive electrode side end part 4a when the float 3 is located within a predetermined distance from the grounding means 5 corresponding to the junction part 4c closest to the positive electrode side end part 4a among a plurality of the grounding means 5 or when the float 3 is located outside the grounding means 5 and/or a negative electrode grounding means 8b configured so as to ground the junction part 4c closest to the negative electrode side end part 4b, which is an end part on a side opposite to the positive electrode side end part 4a of the resistor string, when the float 3 is located within a predetermined distance from the grounding means 5 corresponding to the junction part 4c closest to the negative electrode side end part 4b among a plurality of the grounding means 5 or when the float 3 is located outside the grounding means 5. When the float 3 is located close to the grounding means 5 corresponding to the junction part 4c closest to the positive electrode side end part 4a, the resistance value (between the positive electrode side end part 4a and the negative electrode side end part 4b) of the resistor string 4 becomes the smallest since all the resistors which constitute the resistor string 4 are bypassed as mentioned above. However, when the float 3 passed to the outside of the range in which the grounding means 5 are disposed from the vicinity of the grounding means 5 corresponding to the junction part 4c closest to the positive electrode side end part 4a, there is a possibility that the operation of the grounding means 5 corresponding to the junction part 4c closest to the positive electrode side end part 4a may stop and grounding of the junction part 4c may be shut off. When grounding of the resistor string 4 on the positive electrode side is thus shut off, the resistance value of the resistor string 4 which used to be the smallest value therebefore may suddenly jump to the largest value and therefore the magnitude of the liquid level signal also suddenly jumps up corresponding to this. Then, the information about the liquid level which the liquid level signal output means 6 indicates and the information about the liquid level which the warning signal output means 7 indicates becomes unconformable, an operator is confused. Similar problems may occur also in a case where an error occurs accidentally in the liquid level signal output means 6 when the position of the float 3 is close to the grounding means 5 corresponding to the junction part 4c closest to the positive electrode side end part 4a or the negative electrode side end part 4b.

In the above-mentioned preferred embodiment, the positive electrode side end part 4a of the resistor string 4 is compulsorily grounded by the positive electrode grounding means 8a when the position of the float 3 is close to the grounding means 5 corresponding to the junction part 4c closest to the positive electrode side end part 4a among a plurality of the grounding means 5 or outside the grounding means 5. Thereby, the grounding of the positive electrode side end part 4a is maintained even when the operation of the grounding means 5 corresponding to the junction part 4c closest to the positive electrode side end part 4a stops. Therefore, the above-mentioned problems can be prevented from being generated beforehand. This effect can be acquired equally in both of a case where the grounding means 5 corresponding to the junction part 4c closest to the positive electrode side end part 4a of the resistor string 4 is disposed at the lower limit position of the liquid level and a case where the grounding means 5 corresponding to the junction part 4c closest to the positive electrode side end part 4a of the resistor string 4 is disposed at the upper limit position of the liquid level. Moreover, in accordance with the negative electrode grounding means 8b, the above-mentioned problems which may occur in a case where an error occurs accidentally in the liquid level signal output means 6 when the position of the float 3 is close to the grounding means 5 corresponding to the junction part 4c closest to the negative electrode side end part 4b can be prevented beforehand.

In a preferred embodiment of the present invention, the warning signal output means 7 comprises a logic inverting means 9. A logic inverting circuit outputs a reverse signal inverse to ON and OFF of an input signal, and can be constituted by a transistor, for example. In a case where the warning signal output means 7 is constituted by the additional grounding means 7a as mentioned above, in a configuration which lacks the logic inverting means 9, the warning signal becomes ON and an alarm can be generated based on this, when the output signal from the additional grounding means 7a is ON (namely, when the operation corresponds to approach of the float 3). However, for example, when disconnection and/or poor connection occurs in electric wiring which connects a sensor part 1a that is a part including a plurality of the grounding means 5 and a control part 1b that is a part which performs power supply to the sensor part 1a and extraction of a signal from the sensor part 1a, the output signal from the additional grounding means 7a becomes OFF. Then, since the warning signal does not become ON even when an alarm should be generated, the alarm will not be generated.

Therefore, in a preferred embodiment of the present invention, the warning signal output means 7 is configured such that the logic inverting of the warning signal output is carried out and an alarm is generated when the warning signal is OFF. Therefore, it is possible to bring the warning signal to be OFF to generate an alarm when the output signal from the additional grounding means 7a is ON (namely, when the operation corresponds to approach of the float 3) and bring the warning signal to be ON not to generate an alarm when the output signal from the additional grounding means 7a is OFF (namely, when the operation does not correspond to approach of the float 3). Thereby, since the warning signal becomes OFF to generate an alarm in both of a case where the output signal from the additional grounding means 7a is ON and a case where an error arises in signal wiring, a fail-safe function is attained.

As long as it is possible to ground the junction part 4c corresponding to the grounding means 5 at a position close to the float 3 among the junction parts 4c of the adjacent resistors, any means cam be adopted as a plurality of the grounding means 5 in the present invention. In a preferred embodiment of the present invention, the float comprises a magnet, and the grounding means 5 is configured so as to be operated (ground the corresponding junction part 4c) when a magnetic field generated by the magnet is detected and not to be operated (not ground the corresponding junction part 4c) when a magnetic field generated by the magnet is not detected. Moreover, in another preferred embodiment of the present invention, the grounding means 5 is constituted by either a reed switch or a Hall IC. A reed switch is a mechanical switch which closes when a magnetic field is detected and opens otherwise. A Hall IC is an electric element constituted by a Hall element and a switching circuit, and grounds an output terminal with the ground (earth) when the Hall element detects a magnetic field and shuts off (intercepts) the output terminal from the ground (earth) otherwise. A configuration which comprises the above-mentioned magnet and reed switch or the above-mentioned Hall IC can be applied also to the warning signal output means 7. In another preferred embodiment, the sleeve 2 and the float 3 are constituted by light-transmissible material, the float 3 comprises a light source, and the grounding means 5 is constituted by a switch which detects light to be operated.

In a preferred embodiment of the present invention, the direct current power supply comprises a constant current circuit, and resistance values of the resistors which constitute the resistor string are all identical. The constant current circuit holds an electric current value which flows through the resistor string 4 at a constant value. Under this circumstance, when a voltage signal is adopted as the liquid level signal, the magnitude of the voltage signal is proportional to the sum total of the resistance values of the resistors existing between the positive electrode side end part 4a and the grounded grounding means 5 in the resistor strings 4. Therefore, when the resistance values of all the resistors are identical and a plurality of the grounding means 5 are arranged at equal intervals, the magnitude of the voltage signal as the liquid level signal is approximately proportional to the number of the resistors between the positive electrode side end part 4a of the resistor string 4 and the junction part 4c closest to the positive electrode side end part 4a among the grounded grounding means 5. Moreover, since a plurality of the grounding means 5 are arranged at equal intervals, a liquid level sensor excellent in linearity between the liquid level signals and actual liquid levels can be constituted.

In a preferred embodiment of the present invention, the warning signal output means 7 is constituted by a power source different from the above-mentioned direct current power supply (+Vcc) used for taking out the liquid level signal. By constituting the warning signal output means 7 by an independent power source different and separate from the direct current power supply used for the resistor string 4, reliability of the warning signal output means 7 can be further enhanced.

Working Example

Figure 3:
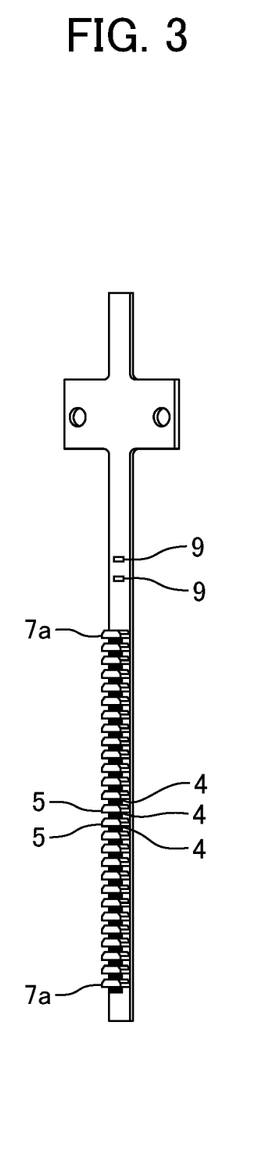
FIG. 3 is a perspective view for showing an example of a resistor string and grounding means according to the present invention.

Next, a configuration of a preferred embodiment of the present invention will be explained further in detail referring to drawings. FIG. 3 is a perspective view for showing an example of the resistor string 4 and the grounding means 5 according to the present invention. In this working example, twenty-five chip resistors which constitute the resistor string 4 and twenty-five Hall ICs which constitute the grounding means 5 are alternatingly mounted by soldering on a long and narrow plate constituted by a printed circuit board. The size of a footprint of a chip resistor is 0.5 mm long and 1.0 mm wide. The height of the Hall IC is 3.2 mm, a pitch interval is 2.5 mm, and the Hall ICs are arranged in an up-and-down direction of FIG. 3. The Hall IC detects magnetic fields in the up-and-down direction of FIG. 3. In this configuration, the pitch interval of the Hall ICs is restricted by the size of the Hall IC itself and the size of the chip resistor arranged between the Hall ICs. A Hall IC as an additional grounding means 7a which constitutes the warning signal output means 7 is further mounted further above the Hall IC located in the top among twenty-five Hall ICs which constitute the grounding means 5 and further below the Hall IC located in the bottom among twenty-five Hall ICs which constitute the grounding means 5, respectively. Two transistors as the logic inverting means 9 for carrying out the logic inverting of the output of these two Hall ICs are respectively mounted above the resistor string 4. From a viewpoint of enhancing the reliability as a liquid level sensor, it is preferable that electric power is supplied to these Hall ICs and transistors by a direct current power supply different from the direct current power supply always connected to the Hall ICs which constitute the grounding means 5.

Figure 4:
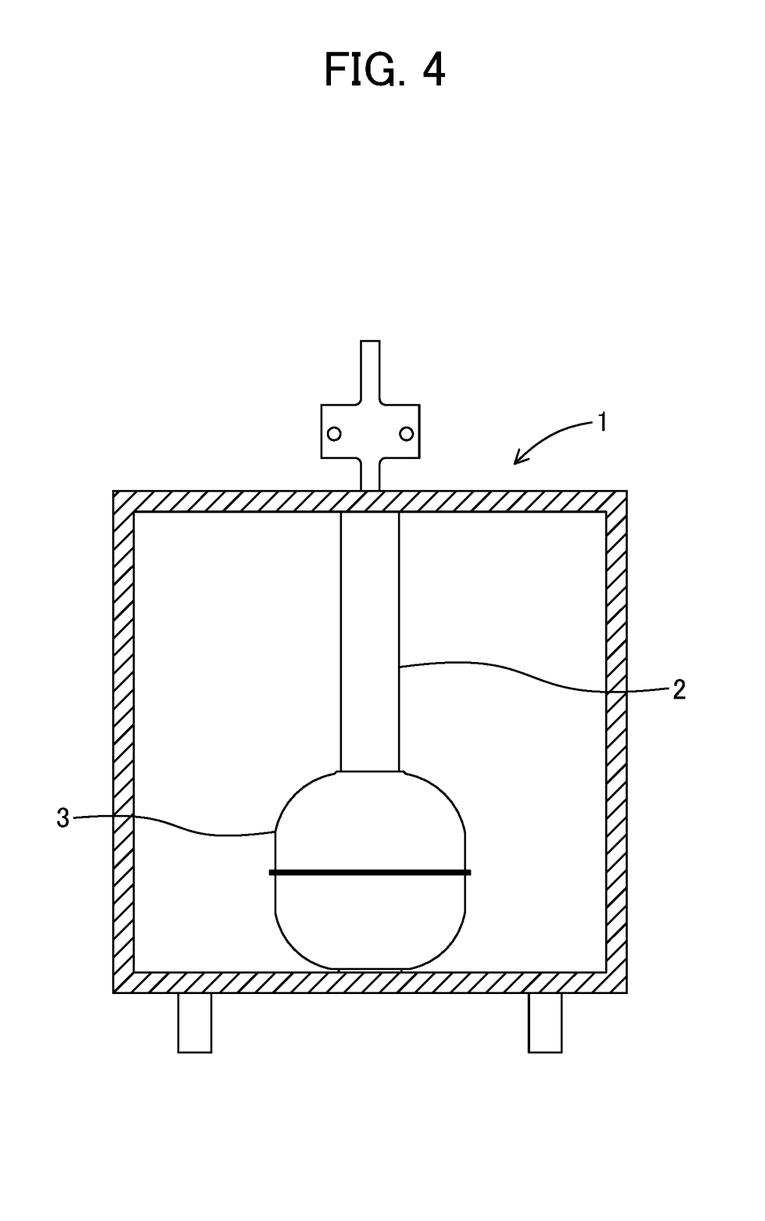
FIG. 4 is a partial sectional view for showing an example of a liquid level sensor according to the present invention.

FIG. 4 is a partial sectional view for showing an example of a liquid level sensor 1 according to the present invention. The sleeve 2 is disposed inside a tank in a vertical direction, and a tip of the printed circuit board shown in FIG. 3 is inserted and fixed to the inside of the sleeve 2. Namely, in this example, not only the twenty-five Hall ICs which constitute the grounding means 5, but also the twenty-five chip resistors which constitute the resistor string 4 are disposed inside the sleeve 2. The sleeve 2 is inserted into a hole at the center of the float 3, and it is configured such that the float 3 moves up and down along the sleeve 2 according to the fluctuation of the liquid level. The float 3 is provided with a magnet in a shape of a ring, which is not shown, and the grounding means 5 and additional grounding means 7a close to the float 3 are operated by a magnetic field generated by the magnet. The output of the liquid level signal and warning signal generated in the printed circuit board disposed inside the sleeve 2 is taken out from an upper part of the printed circuit board, and is led outside via an output terminal, which is not shown.

Figure 5:
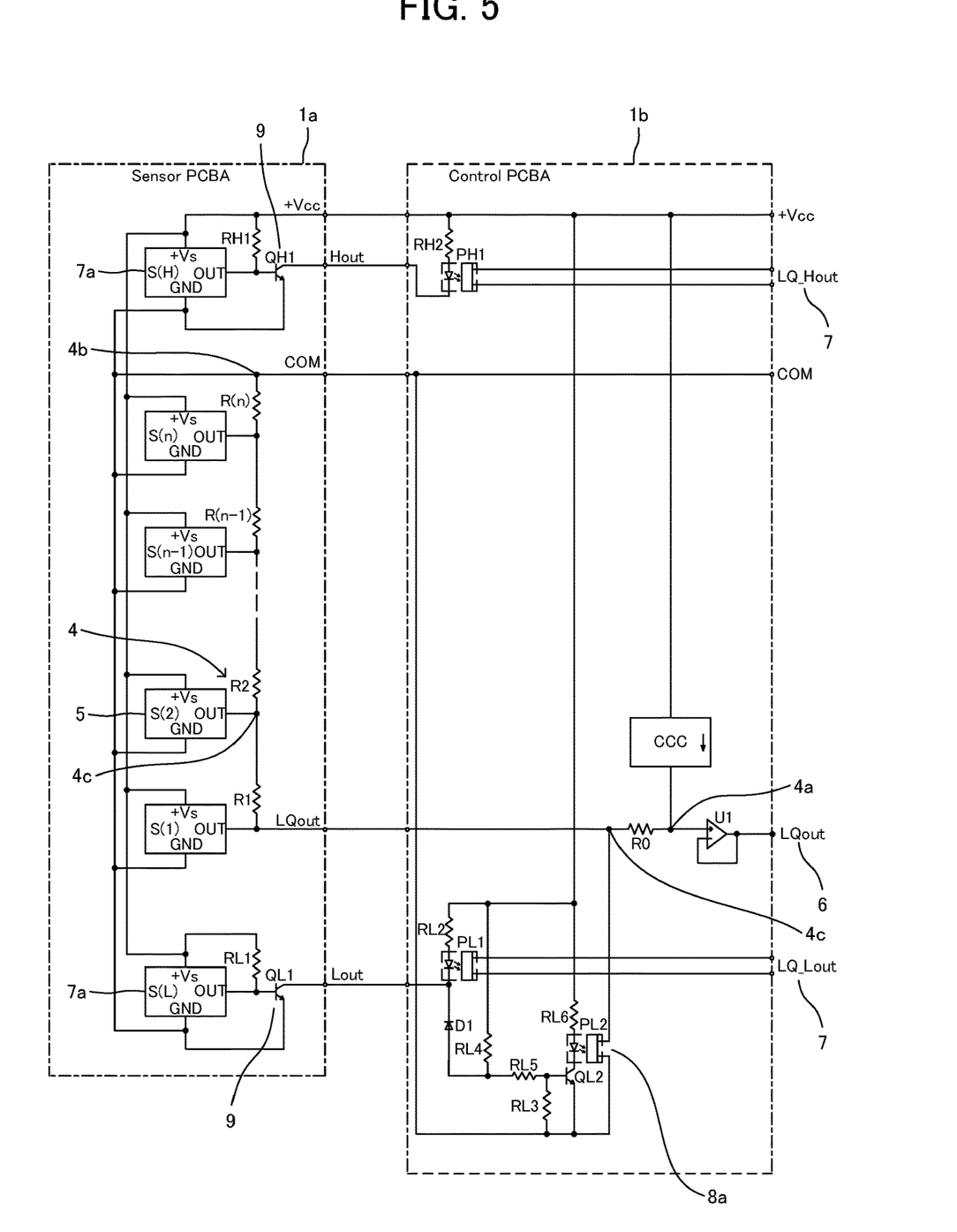
FIG. 5 is a circuit diagram for showing an example of a liquid level sensor according to the present invention.

FIG. 5 is a circuit diagram for showing an example of a liquid level sensor according to the present invention. In this working example, the liquid level sensor 1 is operated by a constant electric current. A circuit of the sensor part 1a constituted by the printed circuit board exemplified in FIG. 3 in shown in the left half of FIG. 5, and a circuit of the control part 1b separated from the sensor part 1a is shown in the right half. The sensor part 1a and the control part 1b are connected by a plurality of wirings. R1, R2 . . . R(n−1) and R (n) included in the sensor part 1a are n resistors which are connected in series to constitute the resistor string 4 of the present invention. The resistor R1 is connected to the resistor R0 through the output terminal LQout, and the n+1 resistors including this R0 in total constitute the resistor string 4. Namely, in this example, among n+1 resistors which constitute the resistor string 4, n resistors R1 to R (n) are disposed inside the sleeve 2 and one resistor is disposed outside the sleeve 2. The positive electrode side end part 4a and the negative electrode side end part 4b of the resistor string 4 are always connected to the direct current power supply (+Vcc). The direct electric current which flows through the resistor string 4 is controlled at a constant value (for example, 1 mA) by a constant current circuit (CCC). In this working example, the resistor R1 which is the second resistor as counted from the positive electrode side end part 4a in the resistor string 4 corresponds to the lower limit of the liquid level, and the resistor R (n) closest to the negative electrode side end part 4b corresponds to the upper limit of the liquid level.

S(1) ... S(n−1) and S(n) are n grounding means 5 to ground the junction parts 4c of the adjacent resistors. The grounding means 5 is constituted by a Hall IC, and comprises an input electrode (+Vs), an output electrode (OUT) and a ground electrode (GND). Between the input electrode (+Vs) and the ground electrode (GND), a voltage (+Vcc) for operating the Hall IC is applied. Each of the output electrodes (OUT) are connected to each of the junction parts 4c of the resistor string 4.

The ground electrode (GND) and the output electrode (OUT) of the Hall IC (S) are insulated in a non-operating state. When the Hall IC (S) detects a magnetic field generated by the magnet, the Hall IC is brought to be in an operating state, resistance between the ground electrode (GND) and the output electrode (OUT) becomes almost zero, and the output electrode (OUT) becomes substantially grounded. Then, no electric current flows through the resistors from the resistor R (n) closest to the negative electrode side end part 4b to the junction part 4c grounded by the grounding means 5, while electric current flows from the resistor R0 closest to the positive electrode side end part 4a to the junction part 4c closest to the positive electrode side end part 4a among the junction parts 4c grounded by the grounding means 5. A voltage signal corresponding to this electric current is output as the liquid level signal to the output terminal (LQout) through a buffer amplifier (U1).

In this working example, the n grounding means 5 are arranged such that the grounding means 5 (S(1)) corresponding to the junction part 4c closest to the positive electrode side end part 4a is on the lower limit side of the liquid level, and the grounding means 5 (S(n)) corresponding to the junction part 4c closest to the negative electrode side end part 4b is on the upper limit side of a liquid level. Moreover, all the resistance values of the resistors R1 to R (n) are identical. Therefore, the number of resistors through which electric current flows increases roughly linearly following the rise of the liquid level. Namely, a proportional relation is established between the position of the float, and the magnitude of the liquid level signal. The liquid level signal is generated within a range from 1.0 V to 5.0 V. In order to set the lower limit value of the liquid level signal to 1.0 V, the resistance of the resistor R0 is set to 1 kΩ.

An additional grounding means 7a (S(L)) which constitutes the warning signal output means 7 for outputting a lower limit alarm Lout as the warning signal is disposed in the outside of the grounding means 5 (S(1)) corresponding to the junction part 4c closest to the positive electrode side end part 4a of the resistor string 4. When this additional grounding means 7a (S(L)) is operated, electric current flows through a resistor RL1. A logic of this current signal is inverted by a transistor QL1 that is the logic inverting means 9, a terminal of the lower limit alarm Lout becomes OFF, and the lower limit alarm is generated in an output terminal (LQ_Lout) via a photo coupler (PL1). Although the additional grounding means 7a (S(L)) is operated by a direct current power supply common to the direct current power supply (+Vcc) which drives the resistor string 4, the additional grounding means 7a (S(L)) has a configuration different from that of the resistor string 4 in a point that the additional grounding means 7a (S(L)) does not comprise a constant current circuit.

Simultaneously with generation of the lower limit alarm, the positive electrode grounding means 8a constituted by a photo coupler (PL2) is operated, and the junction part 4c between the resistor R0 and the resistor R1 is grounded. Thereby, the liquid level signal indicates 1.0 V that is the lower limit, regardless of the state of the grounding means 5. By transmitting a signal through the photo coupler, noise generated in an external electric circuit can be prevented from being transmitted to the electric circuit which constitutes the liquid level sensor to further stabilize the operation of the liquid level sensor.

An additional grounding means 7a (S(H)) which constitutes the warning signal output means 7 for outputting an upper limit alarm Hout as the warning signal is disposed in the outside of the grounding means 5 (S(n)) corresponding to the junction part 4c closest to the negative electrode side end part 4b of the resistor string 4. When this additional grounding means 7a (S(H)) is operated, electric current flows through a resistor RH1. A logic of this current signal is inverted by a transistor QH1 that is the logic inverting means 9, a terminal of the upper limit alarm Hout becomes OFF, and the upper limit alarm is generated in an output terminal (LQ_Hout) via a photo coupler (PH1). Although the additional grounding means 7a (S(H)) is also operated by a direct current power supply common to the direct current power supply (+Vcc) which drives the resistor string 4, the additional grounding means 7a (S(L)) does not comprise a constant current circuit. The warning signal output means 7 which generates the upper limit alarm is not interlocked with the positive electrode grounding means 8a.

In addition, although not shown, in the preferred embodiment of the present invention which has the negative electrode grounding means 8b, the warning signal output means 7 which generates the upper limit alarm and the negative electrode grounding means 8b may be interlocked with each other. For example, it may be configured such that, simultaneously with the generation of the upper limit alarm, the negative electrode grounding means 8b is operated to ground the junction part 4c closest to the negative electrode side end part 4b (junction part 4c between the resistor R (n) and the resistor R (n−1)). In accordance with this configuration, even in a case where abnormalities occur in the grounding means 5 corresponding to the junction part 4c closest to the negative electrode side end part 4b and this junction part 4c cannot be grounded, since this junction part 4c can be grounded by the negative electrode grounding means 8b when the float is located within a predetermined distance from this grounding means 5 or when the float is located outside this grounding means 5, the liquid level signal corresponding to the position of the grounding means 5 corresponding to the junction part 4c closest to the negative electrode side end part 4b. Moreover, in accordance with the negative electrode grounding means 8b, problems as mentioned above, which may be generated in a case where an error occurs accidentally in the liquid level signal output means 6 when the position of the float 3 is close to the grounding means 5 corresponding to the junction part 4c closest to the negative electrode side end part 4b can be prevented from being generated beforehand. In addition, in this case, the configuration of the resistor string 4 may be adjusted such that an output value of the upper limit alarm output when the additional grounding means 7a (S(H)) constituting the warning signal output means 7 which generates the upper limit alarm is grounded coincide with the upper limit value of the liquid level signal (for example, 5.0 V).

In addition, similarly to the above, the positive electrode grounding means 8a may be constituted so as to ground the junction part 4c closest to the positive electrode side end part 4a, rather than the positive electrode side end part 4a. This configuration is preferable since it comes to that at least one of a plurality of the sensors S(1) to S(n) which constitute a plurality of the grounding means 5 always grounds the corresponding junction part 4c and a logic circuit and the liquid level signal are consistent with each other irrespective of the position of the float.

Figure 6:
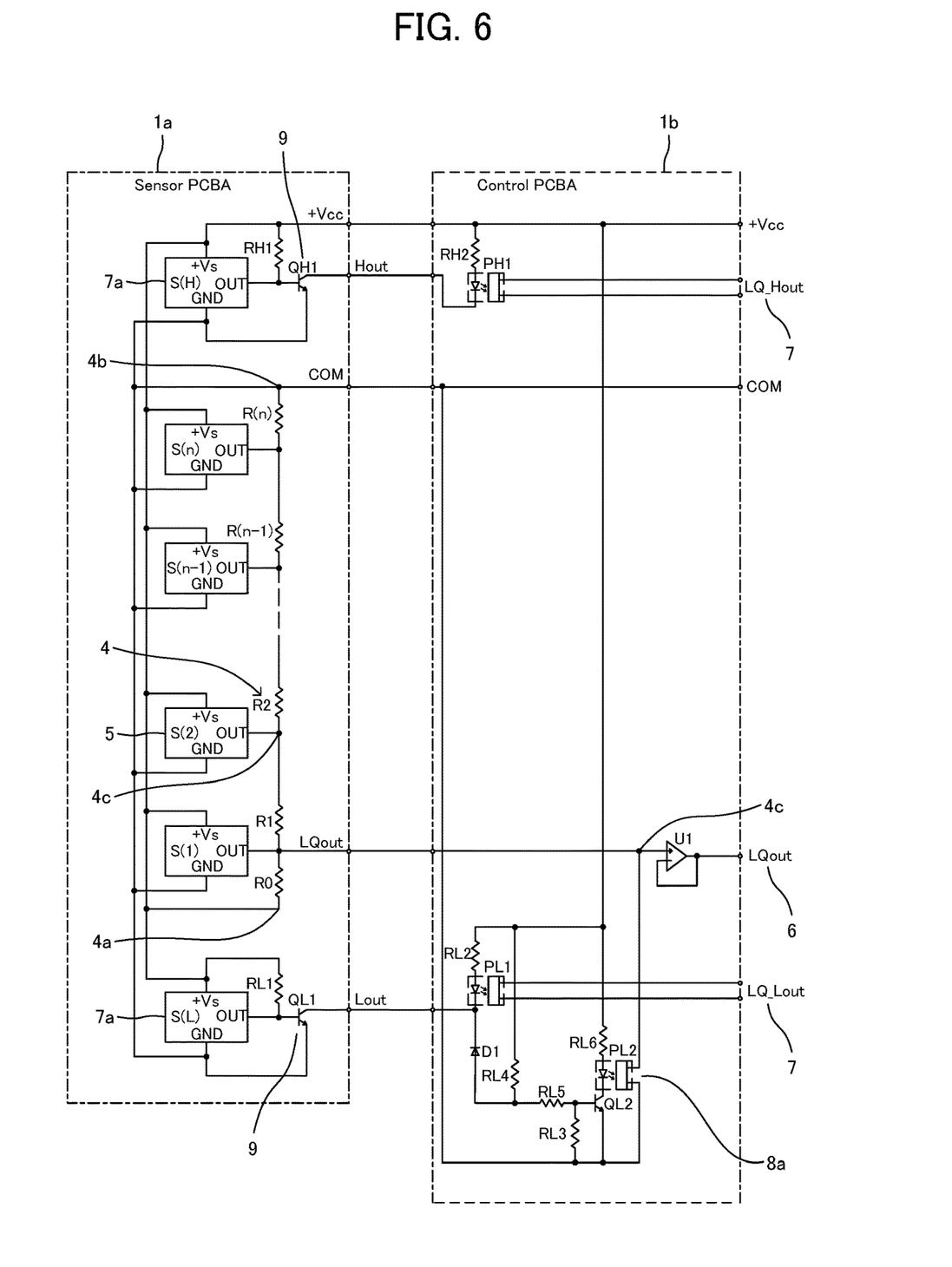
FIG. 6 is a circuit diagram for showing another example of a liquid level sensor according to the present invention.

FIG. 6 is a circuit diagram for showing another example of a liquid level sensor according to the present invention. In this working example, unlike the working example shown in FIG. 5, the liquid level sensor 1 is driven with a constant voltage. The resistor string 4 is constituted by n+1 resistor from R0 to R (n) disposed inside the sleeve 2, and the positive electrode side end part 4a and the negative electrode side end part 4b thereof are always connected to a direct current power supply (+Vcc). The resistor R0 is provided as a load resistance for keeping the direct current power supply (+Vcc) from short-circuiting when the grounding means S(1) is operated. Also in this working example, n grounding means 5 are arranged such that the grounding means 5 (S(1)) corresponding to the junction part 4c closest to the positive electrode side end part 4a is on the lower limit side of the liquid level, while the grounding means 5 (S(n)) corresponding to the junction part 4c closest to the negative electrode side end part 4b is on the upper limit side of the liquid level. Therefore, since the number of the resistors to which a voltage is applied increases following the rise of the liquid level, electric current which flows through the resistor string 4 becomes smaller. Namely, the magnitude of the liquid level signal output to an output terminal (LQout) changes nonlinearly with the rise of the liquid level. In this working example, since an electric circuit becomes simpler as compared with the case of a constant current drive, a risk of malfunction and manufacturing costs can be reduced as a whole. Since the configuration and its functions of parts common to those in FIG. 5 except for the above are the same as those in the case of the working example shown in FIG. 5, the explanations thereof are omitted here.

Figure 7:
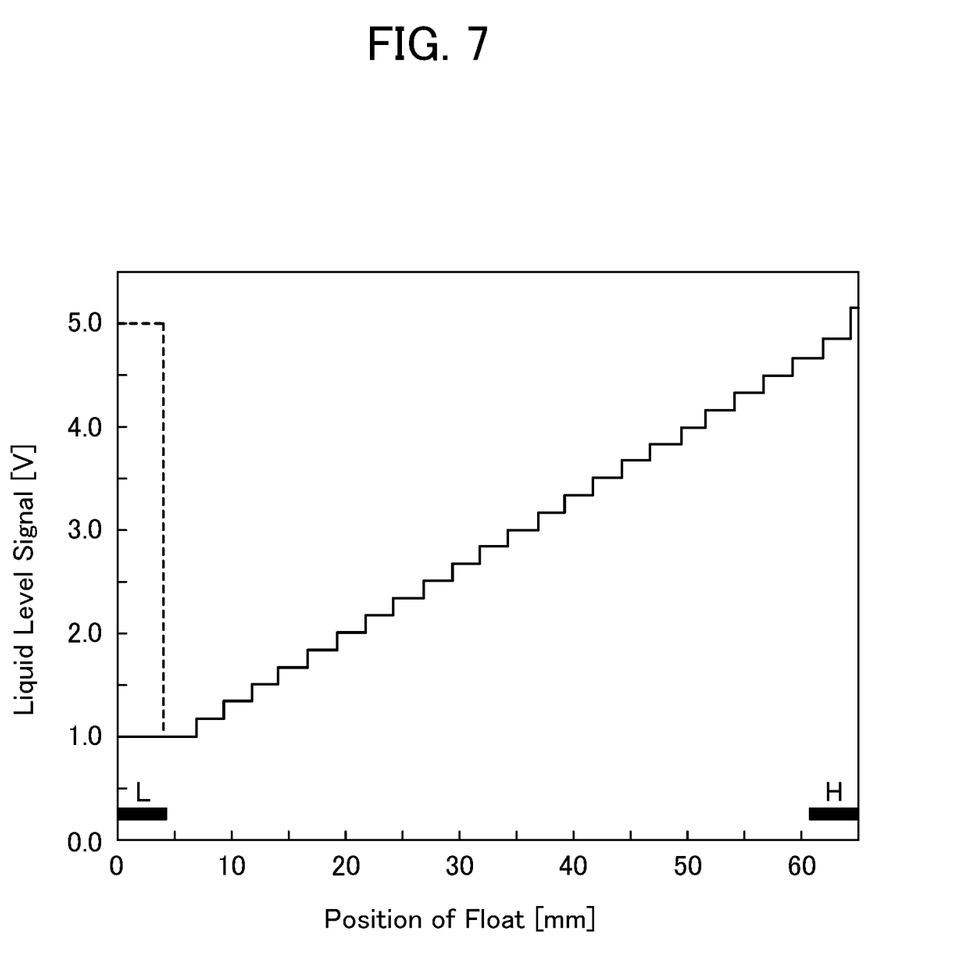
FIG. 7 is a schematic diagram for showing an example of an operation of a liquid level sensor according to the present invention.

FIG. 7 is a schematic diagram for showing an example of an operation of a liquid level sensor according to the present invention. This working example is an example of the constant current drive shown in FIG. 5. The horizontal axis of the diagram indicates the position of the float actually measured from the lower limit position in a unit of mm (millimeter). The vertical axis indicates the liquid level signal actually measured as a voltage signal in a unit of V (volt). The liquid level signal is adjusted so as to become 1.0 V when the float is at the upper limit position and become 5.0 V when the float is at the lower limit position. The liquid level signals are indicated by a graphic chart in a shape of fine steps, and it can be seen that pseudo analog signals having excellent linearity with respect to liquid levels are output. Moreover, the positions of the float when the warning signal output means 7 is operated and the low alarm (L) and the upper limit alarm (H) as warning signals are output are indicated by thick lines, respectively.

In a case where some kind of an error occurs in the liquid level sensor 1 when the float is at the lower limit position in FIG. 7, there is a possibility that the liquid level signal may jump up to 5.0 V as shown by the dot line in FIG. 7. However, in the present invention, since the warning signal output means 7 including the additional grounding means 7a is constituted by an electric circuit different from that in the liquid level signal output means 6, the warning signal (lower limit alarm) itself is generated normally. Furthermore, when the positive electrode grounding means 8a is operated in the preferred embodiment of the present invention which has the positive electrode grounding means 8a, since the liquid level signal is maintained at 1.0 V as indicated by the solid line in FIG. 7, the liquid level signal and the warning signal are consistent with each other, and an operator is not confused.

The invention claimed is:

1. A liquid level sensor comprising:
a sleeve disposed so as to extend in a vertical direction,
a float configured so as to move along said sleeve according to fluctuation of liquid level,
a resistor string including a plurality of resistors connected in series and having both ends always connected with a direct current power supply,
a plurality of grounding means disposed inside said sleeve respectively corresponding to junction parts between adjacent resistors included in said resistors in said resistor string, and configured such that said junction part is grounded when said float is located within a predetermined distance from the corresponding junction part and said junction part is not grounded when said float is not located within the predetermined distance from the corresponding junction part, and
a liquid level signal output means configured so as to take out an electric signal detected between a positive electrode side end part that is an end part connected with a positive electrode of said direct current power supply among said both end parts of said resistor string and said junction part grounded by said grounding means as a liquid level signal that is a signal corresponding to said liquid level,
characterized by further comprising:
a warning signal output means configured such that a warning signal is output when said float is located within a predetermined distance from a warning position that is a predetermined position within a movable range of said float and the warning signal is not output when said float is not located within the predetermined distance from said warning position, and
a positive electrode grounding means configured such that said positive electrode side end part or said junction part closest to said positive electrode side end part is grounded when said float is located within a predetermined distance from said grounding means corresponding to said junction part closest to said positive electrode side end part among a plurality of said grounding means or when said float is located outside the grounding means, and
a negative electrode grounding means configured such that said junction part closest to a negative electrode side end part, which is an end part on a side opposite to said positive electrode side end part of said resistor string, is grounded when said float is located within a predetermined distance from said grounding means corresponding to said junction part closest to said negative electrode side end part among a plurality of said grounding means or when said float is located outside the grounding means.

2. The liquid level sensor according to claim 1, characterized in that:
said warning signal output means is constituted by a power source different from said direct current power supply.

3. The liquid level sensor according to claim 1, characterized in that:
said direct current power supply comprises a constant current circuit, and
resistance values of said resistors which constitute said resistor string are all identical.

4. The liquid level sensor according to claim 3, characterized in that:
said warning signal output means is constituted by a power source different from said direct current power supply.

5. The liquid level sensor according to claim 1, characterized in that:
said float comprises a magnet,
said grounding means is configured such that said corresponding junction part is grounded when a magnetic field generated by said magnet is detected and said corresponding junction part is not grounded when a magnetic field generated by said magnet is not detected, and
said warning signal output means is configured such that said warning signal is output when a magnetic field generated by said magnet is detected and said warning signal is not output when a magnetic field generated by said magnet is not detected.

6. The liquid level sensor according to claim 5, characterized in that:
said warning signal output means is constituted by a power source different from said direct current power supply.

7. The liquid level sensor according to claim 5, characterized in that:
said direct current power supply comprises a constant current circuit, and
resistance values of said resistors which constitute said resistor string are all identical.

8. The liquid level sensor according to claim 7, characterized in that:
said warning signal output means is constituted by a power source different from said direct current power supply.

9. The liquid level sensor according to claim 5, characterized in that:
said grounding means and said warning signal output means comprise either a reed switch or a Hall IC.

10. The liquid level sensor according to claim 9, characterized in that:
said warning signal output means is constituted by a power source different from said direct current power supply.

11. The liquid level sensor according to claim 9, characterized in that:
said direct current power supply comprises a constant current circuit, and
resistance values of said resistors which constitute said resistor string are all identical.

12. The liquid level sensor according to claim 11, characterized in that:
said warning signal output means is constituted by a power source different from said direct current power supply.

13. The liquid level sensor according to claim 1, characterized in that:
said warning signal output means comprises a logic inverting means.

14. The liquid level sensor according to claim 13, characterized in that:
said warning signal output means is constituted by a power source different from said direct current power supply.

15. The liquid level sensor according to claim 13, characterized in that:
said direct current power supply comprises a constant current circuit, and
resistance values of said resistors which constitute said resistor string are all identical.

16. The liquid level sensor according to claim 15, characterized in that:
said warning signal output means is constituted by a power source different from said direct current power supply.

17. The liquid level sensor according to claim 13, characterized in that:
said float comprises a magnet,
said grounding means is configured such that said corresponding junction part is grounded when a magnetic field generated by said magnet is detected and said corresponding junction part is not grounded when a magnetic field generated by said magnet is not detected, and
said warning signal output means is configured such that said warning signal is output when a magnetic field generated by said magnet is detected and said warning signal is not output when a magnetic field generated by said magnet is not detected.

18. The liquid level sensor according to claim 17, characterized in that:
said warning signal output means is constituted by a power source different from said direct current power supply.

19. The liquid level sensor according to claim 17, characterized in that:
said direct current power supply comprises a constant current circuit, and
resistance values of said resistors which constitute said resistor string are all identical.

20. The liquid level sensor according to claim 19, characterized in that:
said warning signal output means is constituted by a power source different from said direct current power supply.

21. The liquid level sensor according to claim 17, characterized in that:
said grounding means and said warning signal output means comprise either a reed switch or a Hall IC.

22. The liquid level sensor according to claim 21, characterized in that:
said warning signal output means is constituted by a power source different from said direct current power supply.

23. The liquid level sensor according to claim 21, characterized in that:
said direct current power supply comprises a constant current circuit, and
resistance values of said resistors which constitute said resistor string are all identical.

24. The liquid level sensor according to claim 23, characterized in that:
said warning signal output means is constituted by a power source different from said direct current power supply.

* * * * *